(12) United States Patent
Yamashita et al.

(10) Patent No.: US 10,875,083 B2
(45) Date of Patent: Dec. 29, 2020

(54) APPARATUS AND METHOD FOR MANUFACTURING FORGED CRANKSHAFT

(71) Applicant: NIPPON STEEL & SUMITOMO METAL CORPORATION, Tokyo (JP)

(72) Inventors: Tomohisa Yamashita, Suita (JP); Kunihiro Yabuno, Matsubara (JP); Ken Yoshino, Guangdong (CN); Sho Takamoto, Osaka (JP); Hiroyuki Kurokawa, Nishinomiya (JP); Kenji Tamura, Takatsuki (JP); Junichi Okubo, Amagasaki (JP); Kiyoshi Nakayama, Osaka (JP); Toru Horiuchi, Osaka (JP)

(73) Assignee: NIPPON STEEL CORPORATION, Tokyo (JP)

( * ) Notice: Subject to any disclaimer, the term of this patent is extended or adjusted under 35 U.S.C. 154(b) by 172 days.

(21) Appl. No.: 15/574,945

(22) PCT Filed: May 19, 2016

(86) PCT No.: PCT/JP2016/064878
§ 371 (c)(1),
(2) Date: Nov. 17, 2017

(87) PCT Pub. No.: WO2016/186165
PCT Pub. Date: Nov. 24, 2016

(65) Prior Publication Data
US 2018/0169742 A1    Jun. 21, 2018

(30) Foreign Application Priority Data
May 19, 2015    (JP) .................................. 2015-101929

(51) Int. Cl.
*B21K 1/08*    (2006.01)
*B21J 5/02*    (2006.01)
(Continued)

(52) U.S. Cl.
CPC    *B21K 1/08* (2013.01); *B21J 5/02* (2013.01); *B21J 5/025* (2013.01); *B21J 13/02* (2013.01); *B21J 13/025* (2013.01); *F16C 3/08* (2013.01)

(58) Field of Classification Search
CPC ....... B21J 5/02; B21J 5/025; B21J 9/02; B21J 13/02; B21J 13/025; B21K 1/08; F02F 2200/04
See application file for complete search history.

(56) References Cited

U.S. PATENT DOCUMENTS

| | | | |
|---|---|---|---|
| 8,468,696 B2 * | 6/2013 | Ohnuma | B21J 5/02 29/888.08 |
| 2009/0116932 A1 * | 5/2009 | Kihara | B21J 13/025 411/369 |

(Continued)

FOREIGN PATENT DOCUMENTS

| | | |
|---|---|---|
| CN | 102548684 | 7/2012 |
| JP | 63-180336 | 7/1988 |

(Continued)

*Primary Examiner* — Christopher J Besler
(74) *Attorney, Agent, or Firm* — Clark & Brody LP

(57) ABSTRACT

A forged crankshaft manufacturing apparatus processes a forged blank with no flash. The forged blank includes at least one rough crank arm having an excess portion protruding from an outer periphery of a side portion thereof. The manufacturing apparatus includes a first die and a second die paired with each other, a retaining device, and a moving device. The first die and the second die bend or crash the excess portion. The retaining device retains at least one of the rough journals or at least one of the rough pins such that a rough pin decentering direction is perpendicular to a reducing direction in which the first die and the second die apply force for reduction. The moving device supports the retaining device such that the retaining device is movable in the reducing direction.

6 Claims, 8 Drawing Sheets

(51) Int. Cl.
*B21J 13/02* (2006.01)
*F16C 3/08* (2006.01)

(56) References Cited

U.S. PATENT DOCUMENTS

| | | | |
|---|---|---|---|
| 2013/0232791 A1* | 9/2013 | Ohnuma | B21K 1/08 29/888.08 |
| 2015/0231689 A1* | 8/2015 | Okubo | B21K 1/08 29/6.01 |

FOREIGN PATENT DOCUMENTS

| | | |
|---|---|---|
| JP | 01-241348 | 9/1989 |
| JP | 2010-230027 | 10/2010 |
| JP | 2012-007726 | 1/2012 |
| WO | WO-2014038183 A1 * | 3/2014 |

* cited by examiner

APPARATUS AND METHOD FOR MANUFACTURING FORGED CRANKSHAFT

TECHNICAL FIELD

The present invention relates to an apparatus and a method for manufacturing a crankshaft by hot forging.

BACKGROUND ART

A reciprocating engine to be employed in a motor vehicle, a motorcycle, an agricultural machine, a marine vessel or the like requires a crankshaft to extract power by converting reciprocating motions of pistons to rotational motion. There are two types of crankshafts: the type manufactured by die forging and the type manufactured by casting. Especially when high strength and high stiffness are required, die forged crankshafts (which will hereinafter be referred to as forged crankshafts) are often employed.

A forged crankshaft is generally manufactured by using a billet as a starting material. The billet has a circular or square cross section, and the cross-sectional area is constant throughout the length. A method for manufacturing a forged crankshaft includes a preforming step, a die forging step, and a trimming step. When a process to finish the interim product into a finished shape and finished size is needed, a coining step is performed after the trimming step. Typically, the preforming step includes a rolling step and a bending step, and the die forging step includes a rough forging step and a finish forging step.

FIGS. 1A to 1F are schematic diagrams illustrating a conventional process for manufacturing a common forged crankshaft. The crankshaft 1 shown in FIG. 1F is a four-cylinder eight-counterweight crankshaft to be mounted in a four-cylinder engine. The crankshaft 1 includes five journals J1 to J5, four pins P1 to P4, a front part Fr, a flange Fl, and eight crank arms (hereinafter referred to simply as "arms") A1 to A8. The eight arms A1 to A8 connect the journals J1 to J5 respectively to the pins P1 to P4. The eight arms A1 to A8 have counterweights (hereinafter referred to simply as "weights") W1 to W8, respectively. The weights W1 to W8 are integrally formed with the arms A1 to A8, respectively.

The four pins P1 to P4 are decentered from the journals J1 to J5. The phases of the pins P1 to P4 are set such that the pins P1 to P4 are positioned plane symmetrically with respect to the journal J3 positioned in the center in the length direction of the crankshaft 1. Accordingly, the arms A4 and A5 connecting with the central journal J3 are plane symmetrical with respect to the central journal J3. Thus, the two arms A4 and A5 both connect with one journal J3 and connect with the pins P2 and P3, respectively, which are in the same phase.

In the following paragraphs, when the journals J1 to J5, the pins P1 to P4, the arms A1 to A8, and the weights W1 to W8 are each collectively referred to, a reference character "J" is used for the journals, a reference character "P" for the pins, a reference character "A" for the arms, and a reference character "W" for the weights. A pin P and a couple of arms A (including weights W) connecting with the pin P are collectively referred to as a "throw".

According to the manufacturing method shown in FIGS. 1A to 1F, the forged crankshaft 1 is manufactured in the following manner. First, a billet 2 with a predetermined length as shown in FIG. 1A is heated in a heating furnace or a gas atmosphere furnace and then undergoes rolling. In the rolling step, the billet 2 is rolled and drawn by grooved rolls. Thereby, the volume of the billet 2 is distributed in the longitudinal direction, and a rolled blank 3, which is an intermediate material, is formed (see FIG. 1B). Next, in the bending step, the rolled blank 3 is partially pressed in a direction perpendicular to the longitudinal direction. Thereby, the volume of the roller blank 3 is distribute, and a bent blank 4, which is a secondary intermediate material, is formed (see FIG. 1C).

Next, in the rough forging step, the bent blank 4 is press forged by a pair of upper and lower dies, whereby a rough forged blank 5 is formed (see FIG. 1D). The rough forged blank 5 has a general shape of the crankshaft (finished product). Then, in the finish forging step, the rough forged blank 5 is further press forged by a pair of upper and lower dies, whereby a finish forged blank 6 is formed (see FIG. 1E). The finish forged blank 6 has a shape in agreement with the shape of the finished crankshaft. In the rough forging and the finish forging, excess material flows out from between the mutually opposed parting surfaces of the dies, thereby forming flash. Therefore, the rough forged blank 5 and the finish forged blank 6 have large flash 5a and 6a around the shape of the crankshaft.

In the trimming step, while the finish forged blank 6 with flash 6a is held by a pair of dies, the flash is punched by a cutting die. Thereby, the flash 6a is removed from the finish forged blank 6. In this manner, a finish forged blank with no flash is obtained, and the finish forged blank with no flash has almost the same shape as the forged crankshaft 1 shown in FIG. 1F. The forged blank with no flash includes rough journals J', rough pins P', rough crank arms A' and rough weights W', which correspond to the journals J, the pins P, the arms A and the weights W, respectively, of the forged crankshaft.

In the coining step, principal parts of the forged blank with no flash are slightly pressed by dies from above and below and shaped to have the correct size and shape of the finished product. In this regard, the principal parts of the forged blank with no flash are, e.g., the rough journals J', the rough pins P', the rough arms A' and the rough weights W'. The principal parts of the forged blank with no flash further include shaft parts such as a rough front part and a rough flange, which correspond to the front part Fr and the flange part Fl of the crankshaft, respectively. In this manner, the forged crankshaft 1 is manufactured.

The process shown in FIGS. 1A to 1F is applicable not only for manufacturing a four-cylinder eight-counterweight crankshaft as illustrated in FIG. 1F but also for manufacturing various other types of crankshafts. For example, the process is applicable for manufacturing a four-cylinder four-counterweight crankshaft.

In a four-cylinder four-counterweight crankshaft, only some of the eight arms A incorporate a weight W. For example, the leading first arm A1, the trailing eighth arm A8, and the two central arms (the fourth arm A4 and the fifth arm A5) incorporate a weight W.

The process shown in FIGS. 1A to 1F can be applied for manufacturing crankshafts that are to be mounted in a three-cylinder engine, an inline six-cylinder engine, a V-type six-cylinder engine, an eight-cylinder engine and the like. It is noted that, when adjustment of the placement angles of the pins is necessary, a twisting step is added after the trimming step.

An exemplary process flow of the manufacturing process shown in FIGS. 1A to 1F is described with reference to the drawings.

FIGS. 2A to 2D are diagrams showing an exemplary process flow of a conventional coining step. FIG. 2A shows a time when a forged blank with no flash has been carried in, FIG. 2B shows a state where the forged blank with no flash is being reduced, FIG. 2C shows a time when an upper die has been moved up, and FIG. 2D shows a time when the forged blank with no flash is to be taken out. In FIGS. 2A to 2D, an apparatus 10 to apply coining and a forged blank with no flash 70 that is a workpiece are shown.

The coining apparatus 10 shown in FIGS. 2A to 2D includes a first lower die 20 and a second upper die 30 paired with each other, a carry-in robot arm 13 (see FIG. 2A), a take-out robot arm 14 (see FIG. 2D), and a knock-out member 15. The first die 20 and the second die 30 are to apply coining to the forged blank with no flash 70. The knock-out member 15 is to release the coined forged blank from the dies.

In the coining step executed by use of the manufacturing apparatus 10, while the first die 20 and the second die 30 are away from each other, a forged blank with no flash 70 is carried in onto the first lower die 20 by the robot arm 13 (see FIG. 2A).

Then, the first die 20 and the second die 30 are moved toward each other and thereby reduce the forged blank with no flash 70. In this way, coining is applied to the forged blank with no flash 70 (see FIG. 2B). Thereafter, the first die 20 and the second die 30 are separated from each other (see FIG. 2C).

Next, the knock-out member 15 is moved up by a lifting device (not shown) and thereby releases the forged blank with no flash from the dies. The processed forged blank 71 is taken out and fed to the next stage by the robot arm 14.

In recent years, there has been a need for weight reduction of reciprocating engines, particularly those for motor vehicles, in order to improve the fuel economy. Accordingly, there is also an ever-increasing demand for weight reduction of crankshafts to be mounted in reciprocating engines. The following techniques are known as ways to reduce the weight of a forged crankshaft.

Patent Literatures 1 and 2 disclose an arm having a recess in the journal-facing surface. These literatures also disclose a method for manufacturing a crankshaft including an arm having a recess. The recess of the arm is formed to lie on a straight line connecting the axis of the journal and the axis of the pin (which will hereinafter be referred to as an "arm centerline"), and the recess is made deep toward the pin. This arm is reduced in weight by an amount corresponding to the volume of the recess. The weight reduction of the arm leads to a weight reduction of the weight paired with the arm, thereby resulting in a weight reduction of the whole forged crankshaft. The arm having a recess has thick portions on both sides of the arm centerline in the region near the pin, which ensures stiffness (both torsional rigidity and flexural rigidity).

Thus, thickening both side portions of an arm and thereby forming a recessed portion in the journal-facing surface of the arm ensure weight reduction and stiffness.

It is, however, difficult to manufacture such a forged crankshaft with such arms having a unique shape by a conventional manufacturing method. The reason is as follows. When a recess is to be formed in the surface of an arm in the die forging step, the draft of the die will become a reverse draft at the site of the recess, and therefore, the formed forged blank will not be able to be released from the die.

To avoid such situations, the manufacturing methods disclosed in Patent Literatures 1 and 2 are configured as follows. In the die forging step, the arm is shaped to be small with no recess formed in the surface of the arm, and after the trimming step, a punch is pushed into the surface of the arm to form a recess.

CITATION LIST

Patent Literature

Patent Literature 1: Japanese Patent Application Publication No. 2012-7726
Patent Literature 2: Japanese Patent Application Publication No. 2010-230027

SUMMARY OF INVENTION

Technical Problems

As disclosed in Patent Literatures 1 and 2, by forming a recess in the journal-facing surface of an arm, it is possible to thicken both side portions of the arm. This permits manufacture of a forged crankshaft with a reduced weight and assured stiffness.

In the manufacturing methods disclosed in Patent Literatures 1 and 2, however, in forming a recess, a surface of an arm is strongly punched and is deformed entirely, and a great force is necessary for the punching. Therefore, a special mechanism for supplying a great force to a punch is required, and it is also necessary to give attention to the durability of the punch.

Then, the inventors suggested forming a recess in the journal-facing surface of an arm by bending an excess portion (PCT/JP2014/005835). Specifically, in a die forging step, a forged blank that includes a rough arm having excess portions protruding from the outer peripheries of both side portions in a region near an adjacent rough pin is formed. In a coining step, the excess portions are bent toward the rough-journal-facing surface of the rough arm by a pair of upper and lower dies. In this case, there is no need to supply a great force to form a recess, and a forged crankshaft having a reduced weight and assured stiffness can be manufactured easily.

Also, the inventors suggested crashing the excess portions, instead of bending, to form a recess in the journal-facing surface of the arm (PCT/JP2014/005850).

However, in a case where bending or crashing of excess portions is carried out during the conventional process flow of a coining step shown by FIGS. 2A to 2D, when the forged blank with no flash 70 is placed on the lower die (the first die 20 in FIG. 2A), the posture of the forged blank with no flash 70 becomes unstable. This is because the forged blank with no flash 70 includes protruding excess portions. Then, there is a possibility that the rough pin decentering direction (the direction in which the rough pins are decentered from the rough journals) of the forged blank with no flash 70 will not be perpendicular to the reducing direction in which the first die 20 and the second die 30 apply force for reduction. In this case, the first die 20 and the second die 30 may fail to apply desired coining to the forged blank with no flash 70 by the reduction. This may cause a problem that the forged blank after processed in the coining step is twisted.

An object of the present invention is to provide a forged crankshaft manufacturing apparatus and a forged crankshaft manufacturing method that deliver stable performance to deform excess portions of a forged blank with no flash.

Solutions to Problems

A forged crankshaft manufacturing apparatus according to an embodiment of the present invention is to process a forged blank with no flash in a process of manufacturing a forged crankshaft. The forged crankshaft includes journals serving as an axis of rotation, pins decentered from the journals, and crank arms connecting the journals and the pins. The forged blank includes rough journals, rough pins and rough crank arms corresponding to the journals, the pins, and the crank arms, respectively, of the forged crankshaft. At least one of the rough crank arms includes an excess portion protruding from the outer periphery of a side portion thereof. The manufacturing apparatus includes a first die and a second die paired with each other, a retaining device, and a moving device. The first die and the second dies are to bend or crash the excess portion. The retaining device is to retain at least one of the rough journals or at least one of the rough pins of the forged blank such that a rough pin decentering direction in which the rough pins are decentered from the rough journals is perpendicular to a reducing direction in which the first die and the second die apply force for reduction. The moving device is to support the retaining device such that the retaining device is movable along the reducing direction.

A forged crankshaft manufacturing method according to an embodiment of the present invention is a method for manufacturing a forged crankshaft including journals serving as an axis of rotation, pins decentered from the journals, and crank arms connecting the journals and the pins. The manufacturing method includes a first step and a second step. By the first step, a forged blank with no flash is obtained. The forged blank includes rough journals, rough pins and rough crank arms corresponding to the journals, the pins and the crank arms, respectively, of the forged crankshaft. At least one of the rough crank arms includes an excess portion protruding from an outer periphery of a side portion thereof. In the second step, the excess portion of the forged blank with no flash is bent or crashed. In the second step, the above-described manufacturing apparatus is used. In the second step, the excess portion of the rough crank arm is deformed, whereby the rough crank arm is shaped into a crank arm with a thick side portion.

Advantageous Effects of Invention

The forged crankshaft manufacturing apparatus according to the present invention includes a retaining device. Therefore, the manufacturing apparatus according to the present invention can retain a forged blank with no flash including an excess portion in a specified posture. The manufacturing apparatus according to the present invention further includes a moving device. Therefore, the forged blank with no flash can be reduced by the first die and the second die while being kept in the specified posture. Thus, the forged crankshaft manufacturing apparatus and the forged crankshaft manufacturing method can deliver stable performance to bend or crash the excess portion of a forged blank with no flash.

DESCRIPTION OF EMBODIMENTS

Figure 1A:
FIG. 1A is a schematic diagram of a billet during a conventional process of manufacturing a forged crankshaft.
Figure 1B:
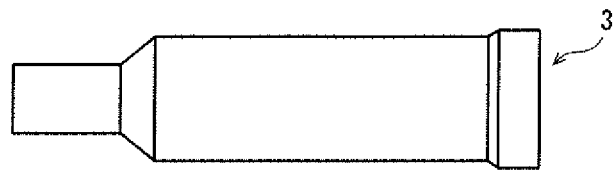
FIG. 1B is a schematic diagram of a rolled blank during the conventional process of manufacturing a forged crankshaft.
Figure 1C:
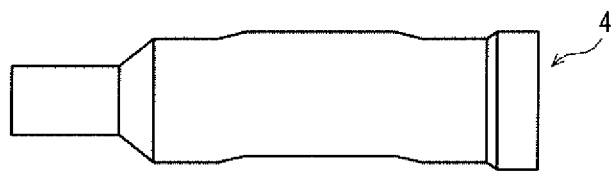
FIG. 1C is a schematic diagram of a bent blank during the conventional process of manufacturing a forged crankshaft.
Figure 1D:
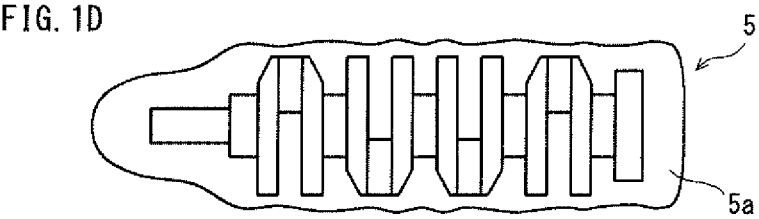
FIG. 1D is a schematic diagram of a rough forged blank during the conventional process of manufacturing a forged crankshaft.
Figure 1E:
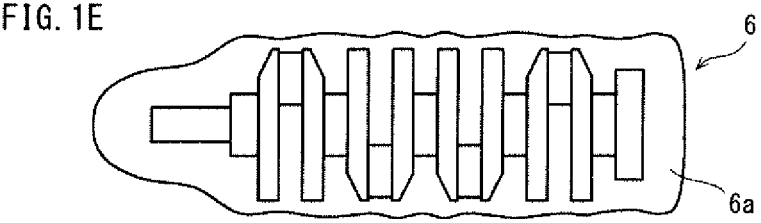
FIG. 1E is a schematic diagram of a finish forged blank during the conventional process of manufacturing a forged crankshaft.
Figure 1F:
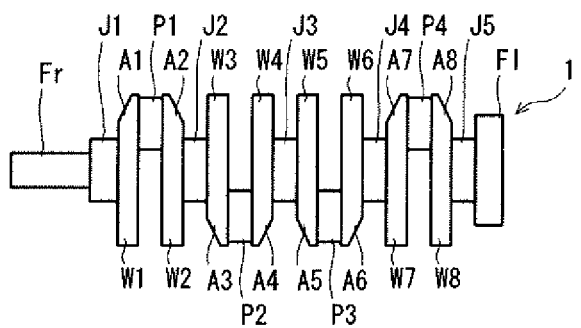
FIG. 1F is a schematic diagram of a crankshaft during the conventional process of manufacturing a forged crankshaft.
Figure 2A:
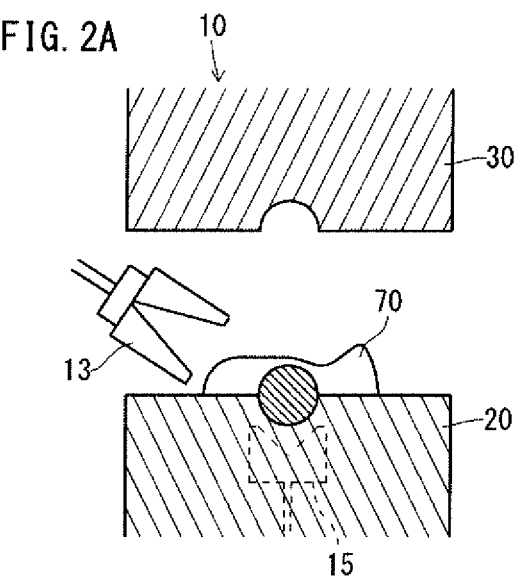
FIG. 2A is a diagram showing a time when a forged blank with no flash has been carried in during a conventional coining step.
Figure 2B:
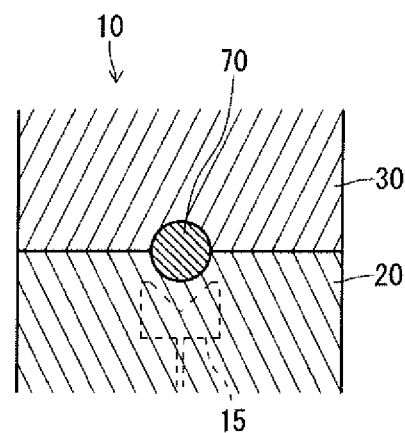
FIG. 2B shows a state where the forged blank with no flash is being reduced during the conventional coining step.
Figure 2C:
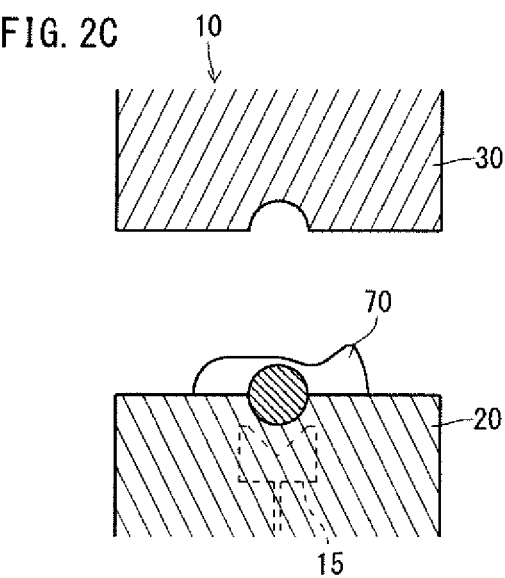
FIG. 2C shows a time when an upper die has been moved up during the conventional coining step.
Figure 2D:
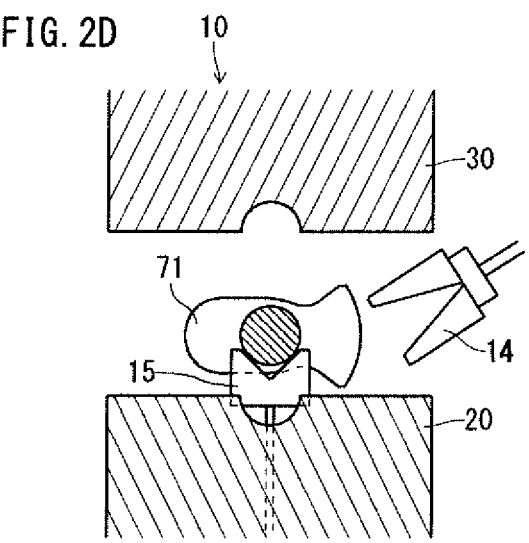
FIG. 2D shows a time when the forged blank with no flash is to be taken out during the conventional coining step.

A forged crankshaft manufacturing apparatus according to an embodiment of the present invention is to process a forged blank with no flash during a process of manufacturing a forged crankshaft. The forged crankshaft includes journals serving as an axis of rotation, pins decentered from the journals, and crank arms connecting the journals and the pins. The forged blank includes rough journals, rough pins and rough crank arms corresponding to the journals, the pins, and the crank arms, respectively, of the forged crankshaft. At least one of the rough crank arms includes an excess portion protruding from the outer periphery of a side portion thereof. The manufacturing apparatus includes a first die and a second die paired with each other, a retaining device, and a moving device. The first die and the second die are to bend or crash the excess portion. The retaining device is to retain at least one of the rough journals or at least one of the rough pins of the forged blank such that a rough pin decentering direction in which the rough pins are decentered from the rough journals is perpendicular to a reducing direction in which the first die and the second die apply force for reduction. The moving device is to support the retaining device such that the retaining device is movable along the reducing direction.

The moving device preferably moves the retaining device such that the forged blank is positioned in the center between the first die and the second die while contacting both the first die and the second die.

In the manufacturing apparatus, the retaining device preferably includes a third pair of dies, and a holder. In this case, the third pair of dies supports the rough journals or the rough pins by nipping the rough journals or the rough pins from both sides. The holder holds the third pair of dies such that the third dies are movable away from and toward each other. The moving device includes a first elastic member that is stretchable in the reducing direction. The first elastic member connects the first die to the holder.

It is preferred that the manufacturing apparatus further includes a second elastic member that is stretchable in the reducing direction. In this case, the second elastic member is configured to connect and disconnect the second die to and from the holder. Further, the manufacturing apparatus preferably applies coining to the forged blank.

A forged crankshaft manufacturing method according to an embodiment of the present invention is a method for manufacturing a forged crankshaft including journals serving as an axis of rotation, pins decentered from the journals, and crank arms connecting the journals and the pins. The manufacturing method includes a first step and a second step. By the first step, a forged blank with no flash is obtained. The forged blank includes rough journals, rough pins and rough crank arms corresponding to the journals, the pins and the crank arms, respectively, of the forged crankshaft. At least one of the rough crank arms includes an excess portion protruding from the outer periphery of a side portion thereof. In the second step, the excess portion of the forged blank with no flash is bent or crashed. The above manufacturing apparatus is used in the second step. The excess portion of the rough crank arm is deformed in the second step, whereby the rough crank arm is shaped into a crank arm with a thick side portion.

In the manufacturing method, the excess portion may be a first excess portion protruding from the outer periphery of a side portion in a region near an adjacent rough pin. In this case, the first excess portion of the rough crank arm is deformed in the second step, whereby the rough crank arm is shaped into a crank arm with a thick side portion in the region near the adjacent pin.

In the manufacturing method, the excess portion may be a second excess portion protruding from the outer periphery of a side portion in a region near an adjacent rough journal. In this case, the second excess portion of the rough crank arm is deformed in the second step, whereby the rough crank arm is shaped into a crank arm with a thick side portion in the region near the adjacent journal.

In the above-described manufacturing method, preferably, coining is applied to the forged blank in the second step.

A case where the forged crankshaft manufacturing apparatus and the forged crankshaft manufacturing method according to the present invention are adopted in a coining step will hereinafter be described with reference to the drawings.

1. Shape of Crankshaft

Figure 5A:
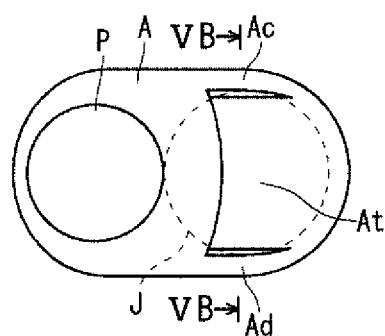
FIG. 5A is a front view of an arm of a crankshaft after processed in the coining step, the arm having a second exemplary configuration and the front view showing the shape viewed from a pin side.
Figure 5B:
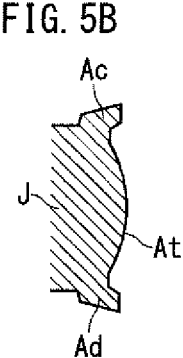
FIG. 5B is a sectional view along the line VB-VB in FIG. 5A.

A forged crankshaft according to the present embodiment includes journals serving as an axis of rotation, pins decentered from the journals, and crank arms connecting the pins and the journals. The forged crankshaft may include an arm having a first exemplary configuration as shown in FIGS. 3A to 3D. The forged crankshaft may include an arm having a second exemplary configuration as shown in FIGS. 5A and 5B, or may include an arm having a third exemplary configuration as shown in FIGS. 7A to 7D.

Figure 3A:
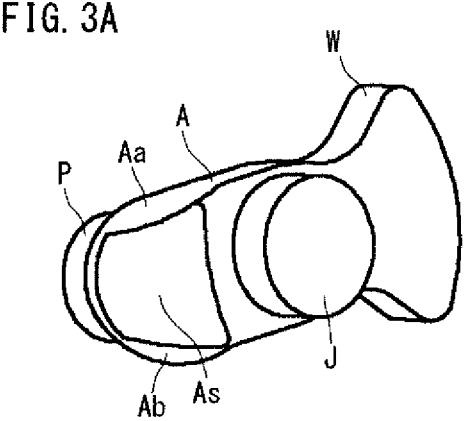
FIG. 3A is a perspective view showing the shape of an arm of a crankshaft after processed in the coining step, the arm having a first exemplary configuration.
Figure 3B:
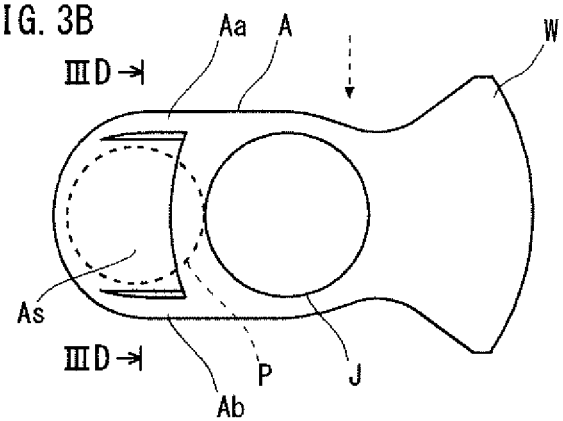
FIG. 3B is a front view of the arm of the crankshaft after processed in the coining step, the arm having the first exemplary configuration and the front view showing the shape viewed from a journal side.
Figure 3C:
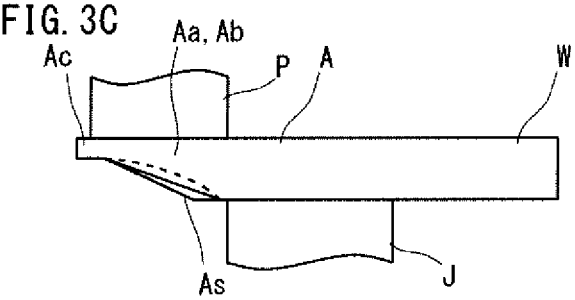
FIG. 3C is a view from a direction indicated by the dashed arrow in FIG. 3B.
Figure 3D:
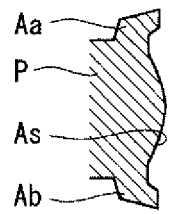
FIG. 3D is a sectional view along the line IIID-IIID in FIG. 3B.

FIGS. 3A to 3D are diagrams showing the shape of an arm of a crankshaft after processed in the coining step, the arm having a first exemplary configuration according to the present invention. FIG. 3A is a perspective view, FIG. 3B is a front view from the journal side, FIG. 3C is a side view, and FIG. 3D is a sectional view along the line IIID-IIID in FIG. 3B. In FIGS. 3A to 3D, an arm (with a weight) of the crankshaft is representatively shown, and the other arms are omitted. FIG. 3C is a view from the direction indicated by the dashed arrow in FIG. 3B.

The arm A having the first exemplary configuration, as shown in FIGS. 3A to 3D, has a recess in the journal J-facing surface, in a region near a pin P adjacent thereto, in an area As inside of both side portions Aa and Ab. The side portions As and Ab in the region near the adjacent pin P bulge toward the journal J. The thicknesses of the side portions Aa and Ab are greater than the thickness of the recess in the inner area As.

In the first exemplary configuration, the arm A has thick side portions Aa and Ab in the region near the adjacent pin P, and has a recess in the journal J-facing surface. According to the present embodiment, the recess made in the arm A leads to a weight reduction of the forged crankshaft. Besides, the thick side portions Aa and Ab of the arm A ensure stiffness.

In the arm A having the first exemplary configuration, both side portions As and Ab in the region near the adjacent pin P are thick. However, only one side portion of the arm A in the region near the adjacent pin P may be thick. Even in this case, the thick portion of the arm A in the region near the adjacent pin P ensures the arm A stiffness.

As shown in FIGS. 3A to 3D, a case where the arm having the first exemplary configuration is an arm with a weight has been described. All of the arms of the crankshaft may have the first exemplary configuration. At least one of the arms of the crankshaft may have the first exemplary configuration. There is no limit to the shapes of the other arms than the arms having the first exemplary configuration. For example, the other arms than the arms having the first exemplary configuration may have a weight or alternatively may have no weight. The other arms than the arms having the first exemplary configuration may have a second exemplary configuration and/or a third exemplary configuration, which will be described below.

Figure 4A:
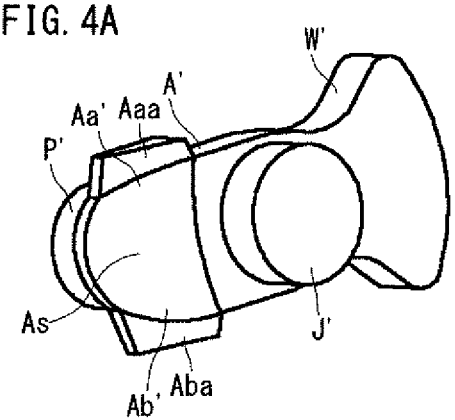
FIG. 4A is a perspective view showing the shape of a rough arm of a forged blank before processed in the coining step, the rough arm being for the arm having the first exemplary configuration.
Figure 4B:
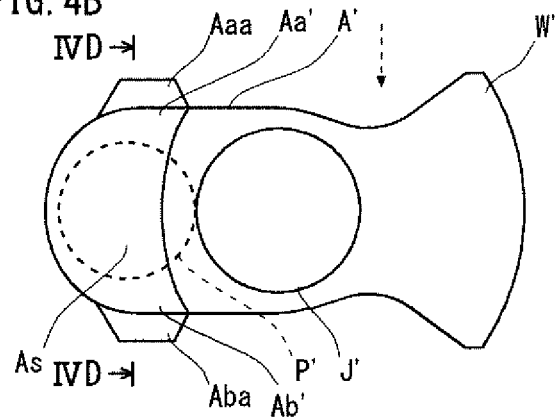
FIG. 4B is a front view of the rough arm of the forged blank before processed in the coining step, the rough arm being for the arm having the first exemplary configuration and the front view showing the shape viewed from a rough journal side.
Figure 4C:
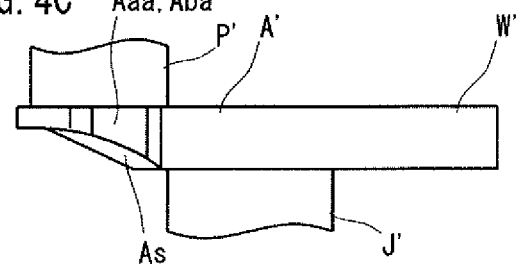
FIG. 4C is a view from a direction indicated by the dashed arrow in FIG. 4C.
Figure 4D:
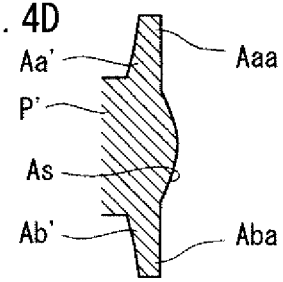
FIG. 4D is a sectional view along the line IVD-IVD in FIG. 4B.

FIGS. 4A to 4D are diagrams showing the shape of a rough arm of the forged blank with no flash before processed in the coining step, the rough arm being for the arm having the first exemplary configuration according to the present invention. FIG. 4A is a perspective view, FIG. 4B is a front view from the rough journal side, FIG. 4C is a side view, and FIG. 4D is a sectional view along the line IVD-IVD in FIG. 4B. In FIGS. 4A to 4D, a rough arm (with a rough weight) of the forged blank with no flash is representatively shown, and the other rough arms are omitted. FIG. 4C is a view from the direction indicated by the dashed arrow in FIG. 4B.

The rough arm A' before processed in the coining step, as shown in FIGS. 4A to 4D, has the same surface shape as the finished product after processed in the coining step, in the rough-journal J'-facing surface, in a region near a rough pin P' adjacent thereto, in an area As inside of both side portions Aa' and Ab'. The surface shape extends smoothly to the side portions Aa' and Ab' in the region near the adjacent rough pin P'. Accordingly, the thicknesses of the side portions Aa' and Ab' are smaller than the thicknesses of the side portions of the finished product after processed in the coining step.

The rough arm A' has excess portions Aaa and Aba protruding from the outer peripheries of the side portions Aa' and Ab' in the region near the adjacent rough pin P'. Such an excess portion provided to a rough arm and protruding from the outer periphery of a side portion of the rough arm in a region near a rough pin P' adjacent to the rough arm will hereinafter be referred to as a first excess portion. The first excess portions Aaa and Aba are plate-shaped, and are disposed along the outer periphery of the side portion Aa' and the outer periphery of the side portion Ab', respectively, in the region near the adjacent rough pin P'. The thicknesses of the first excess portions Aaa and Aba are comparable to or less than the thicknesses of the side portions Aa' and Ab' which are the bases thereof.

In the forged blank with no flash, every one of the rough arms A' may have the first excess portions Aaa and Aba, or at least one of the rough arms A' may have the first excess portions Aaa and Aba. In the first exemplary configuration, the rough arm A' has two first excess portions Aaa and Aba. However, the rough arm A' may have only one first excess portion. In this case, in the finished crankshaft, the arm has one thick side portion.

The rough arm shown in FIGS. 4A to 4D for the arm having the first exemplary configuration is a rough arm with a rough weight. All of the rough arms of the forged blank may have the first exemplary configuration. At least one of the rough arms of the forged blank may have the first exemplary configuration. There is no limit to the shapes of the other rough arms than the rough arms for the arms having the first exemplary configuration. For example, the other rough arms than the rough arms for the arms having the first exemplary configuration may have a rough weight or alternatively may have no rough weight. The side portions of the other rough arms than the rough arms for the arms having the first exemplary configuration need not be thickened. The other rough arms than the rough arms for the arms having the first exemplary configuration may have a second exemplary configuration and/or a third exemplary configuration, which will be described below. Thus, the shape of the forged blank with no flash is determined according to the shape of the crankshaft.

In the above-described first exemplary configuration, the excess portions protrude from the outer peripheries of the side portions of the rough arm A' in the region near the adjacent rough pin P'. However, the excess portions may protrude from the outer peripheries of the side portions in a region near a rough journal J' adjacent thereto. In this case, in the finished crankshaft, the arm has thick side portions in a region near a journal adjacent thereto. Such an excess portion provided to a rough arm and protruding from the outer periphery of a side portion of the rough arm in a region near a rough journal J' adjacent to the rough arm will hereinafter be referred to as a second excess portion.

FIGS. 5A and 5B are diagrams showing an arm of a crankshaft after processed in the coining step, the arm having a second exemplary configuration according to the present invention. FIG. 5A is a front view from the pin side, and FIG. 5B is a sectional view along the line VB-VB in FIG. 5A. In the second exemplary configuration, the crankshaft includes a plurality of arms, and at least one of the arms has no weight integrated therewith. In FIGS. 5A and 5B, an arm with no weight of the crankshaft is representatively shown, and the other arms of the crankshaft are not shown.

In the second exemplary configuration, as in the first exemplary configuration, the arm A has thick side portions in the region near the adjacent pin P and has a recess in the journal J-facing surface, though it is not shown in the drawings. The arm A having the second exemplary configuration further has another recess in the pin P-facing surface, in a region near a journal J adjacent thereto, in an area At inside of both side portions Ac and Ad. The side portions Ac and Ad in the region near the adjacent journal J bulge toward the adjacent pin P. The thicknesses of the side portions Ac and Ad are greater than the thickness of the recess in the area At.

The arm A having the second exemplary configuration has thick side portions in the region near the adjacent pin P and has a recess in the journal J-facing surface. Further, the arm A has thick side portions Ac and Ad in the region near the adjacent journal J and has another recess in the pin P-facing surface. In the second exemplary configuration, the recesses formed in the journal J-facing surface and the pin P-facing surface of the arm A lead to a further weight reduction of the forged crankshaft. Besides, the thick side portions in the region near the adjacent pin P and the thick side portions Ac and Ad in the region near the journal J ensure the arm A stiffness.

In the second exemplary configuration, both side portions of the arm A in the region near the adjacent pin P are thick, and both side portions Ac and Ad of the arm A in the region near the adjacent journal J are thick. However, only one side portion of the arm A in the region near the adjacent pin P may be thick, and only one side portion of the arm A in the region near the adjacent journal J may be thick. Also, not all of the arms A with no weights need to have thick side portions in the region near the adjacent pin P and in the region near the adjacent journal J.

All of the arms with no weights may have the second exemplary configuration. At least one of the arms with no weights may have the second exemplary configuration. The arms with no weights do not need to have the second exemplary configuration. For example, when the arms with weights have the first exemplary configuration or the third exemplary configuration, the arms with no weights do not need to have thick side portions.

Figure 6A:
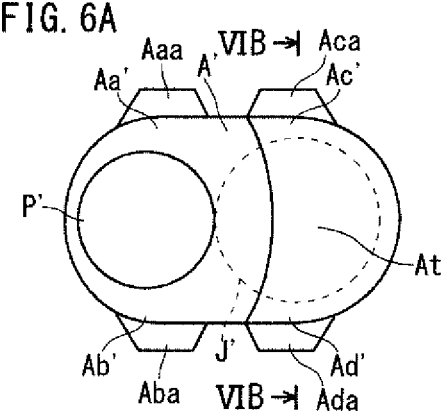
FIG. 6A is a front view of a rough arm of a forged blank before processed in the coining step, the rough arm being for the arm having the second exemplary configuration and the front view showing the shape viewed from a rough pin side.
Figure 6B:
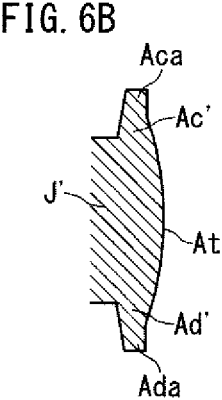
FIG. 6B is a sectional view along the line VIB-VIB in FIG. 6A.

FIGS. 6A and 6B are diagrams showing the shape of a rough arm of a forged blank before processed in the coining step, the rough arm being for the arm having the second exemplary configuration according to the present invention. FIG. 6A is a front view from the rough pin side, and FIG. 6B is a sectional view along the line VIB-VIB in FIG. 6A. In FIGS. 6A and 6B, a rough arm with no rough weight is representatively shown, and the other arms are not shown.

As in the first exemplary configuration, the rough arm A' before processed in the coining step has the same surface shape as the finished product after processed in the coining step, in the rough-journal J'-facing surface, in a region near a rough pin P' adjacent thereto, in an area inside of both side portions Aa' and Ab'. Further, as in the first exemplary configuration, the rough arm A' has first excess portions Aaa and Aba protruding from the outer peripheries of the side portions Aa' and Ab' in the region near the adjacent rough pin P'.

Unlike in the first exemplary configuration, the rough arm A' before processed in the coining step, as shown in FIGS. 6A and 6B, has the same surface shape as the finished product after processed in the coining step, in the rough-pin P'-facing surface, in a region near a rough journal J' adjacent thereto, in an area At inside of both side portions Ac' and Ad'. The surface shape extends smoothly to the side portions Ac' and Ad' in the region near the adjacent rough journal J'. Accordingly, the thicknesses of the side portions Ac' and Ad' are smaller than the thicknesses of the side portions of the finished product after processed in the coining step.

The rough arm A' has second excess portions Aca and Ada protruding from the outer peripheries of the side portions Ac' and Ad' in the region near the adjacent rough journal J'. The second excess portions Aca and Ada are plate-shaped, and are disposed along the outer periphery of the side portion Ac' and the outer periphery of the side portion Ad', respectively, in the region near the adjacent rough journal J'. The thicknesses of the second excess portions Aca and Ada are comparable to or less than the thicknesses of the side portions Ac' and Ad' which are the bases thereof.

In the forged blank with no flash, every one of the rough arms A' with no rough weights may have the second excess portions Aca and Ada, or at least one of the rough arms A' with no rough weights may have the second excess portions Aaa and Aba. In the second exemplary configuration, the rough arm A' has two first excess portions Aaa and Aba and two second excess portions Aca and Ada. However, the rough arm A' may have only one first excess portion and only one second excess portion. When the rough arm A' has only one second excess portion, in the finished crankshaft, the arm has one thick side portion in the region near the adjacent journal. Also, at least one of the rough arms with no rough weights may have one or two first excess portions or one or two second excess portions. Further, at least one of the rough arms with no rough weights may have neither the first excess portions nor the second excess portions.

All of the rough arms with no rough weights may have the second exemplary configuration. At least one of the rough arms with no rough weights may have the second exemplary configuration. The rough arms with no rough weights do not need to have the second exemplary configuration. For example, when the rough arms with rough weights have the first exemplary configuration or the third exemplary configuration, none of the rough arms with no rough weights needs to have the first excess portions or the second excess portions.

Figure 7A:
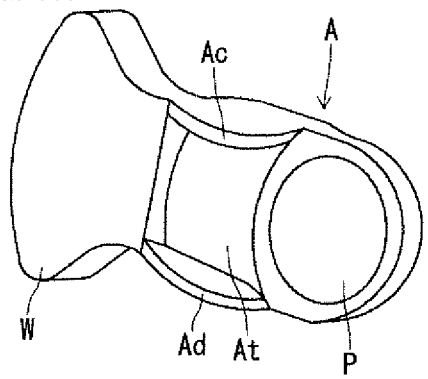
FIG. 7A is a perspective view showing the shape of an arm of a crankshaft after processed in the coining step, the arm having a third exemplary configuration.
Figure 7B:
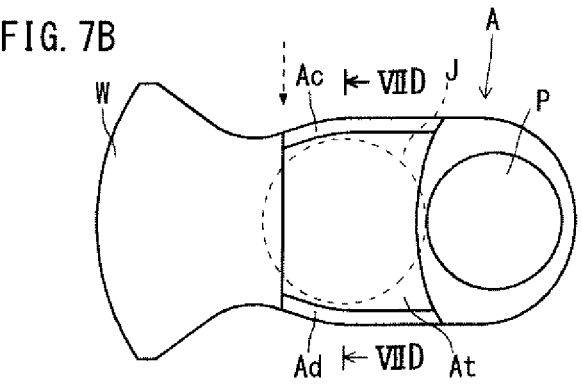
FIG. 7B is a front view of the arm of the crankshaft after processed in the coining step, the arm having the third exemplary configuration and the front view showing the shape viewed from a pin side.
Figure 7C:
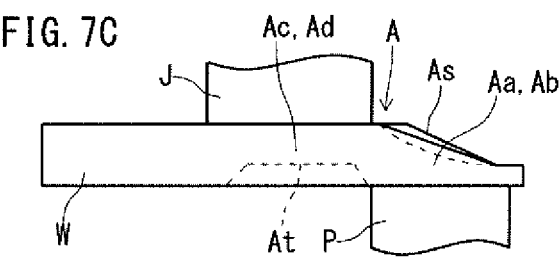
FIG. 7C is a view from a direction indicated by the dashed arrow in FIG. 7B.
Figure 7D:
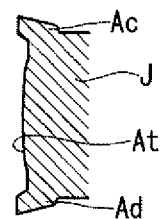
FIG. 7D is a sectional view along the line VIID-VIID in FIG. 7B.

FIGS. 7A to 7D are diagrams showing the shape of an arm of a crankshaft after processed in the coining step, the arm having a third exemplary configuration. FIG. 7A is a perspective view, FIG. 7B is a front view from the pin side, FIG. 7C is a side view, and FIG. 7D is a sectional view along the line VIID-VIID in FIG. 7B. In FIGS. 7A to 7D, an arm (with a weight) of the crankshaft is representatively shown, and the other arms are not shown. FIG. 7C is a view from the direction indicated by the dashed arrow in FIG. 7B.

As in the first exemplary configuration, the arm having the third exemplary configuration has thick side portions in a region near a pin P adjacent thereto and has a recess in the journal J-facing surface. In the third exemplary configuration, the arm A, which has a weight W integrated therewith, has thick side portions Ac and Ad in a region near a journal J adjacent thereto, and has another recess in the pin P-facing surface, in the region near the adjacent journal J, in an area At inside of both side portions Ac and Ad.

In the third exemplary configuration, the recesses formed in the journal J-facing surface and the pin P-facing surface of the arm A lead to a further weight reduction of the forged crankshaft. Besides, the thick side portions Aa and Ab in the region near the adjacent pin P and the thick side portions Ac and Ad in the region near the journal J ensure the arm A stiffness.

In the third exemplary configuration, both side portions of the arm A in the region near the adjacent pin P are thick, and both side portions Ac and Ad of the arm A in the region near the adjacent journal J are thick. However, only one side portion of the arm A in the region near the adjacent pin P may be thick, and only one side portion of the arm A in the region near the adjacent journal J may be thick.

All of the arms of the crankshaft may have the third exemplary configuration. At least one of the crankshaft may have the third exemplary configuration.

Figure 8A:
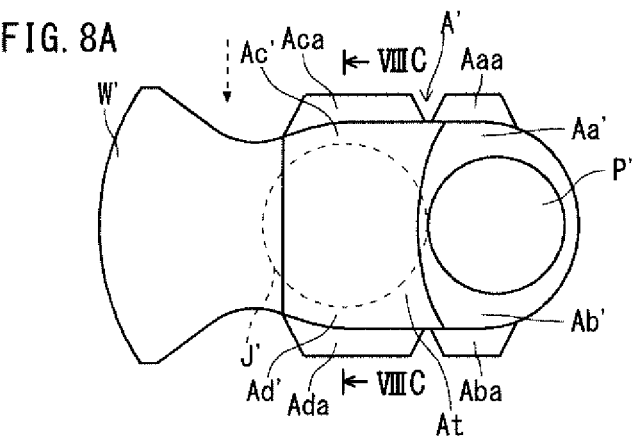
FIG. 8A is a front view of a rough arm of a forged blank before processed in the coining step, the rough arm being for the arm having the third exemplary configuration, the front view showing the shape viewed from a rough pin side.
Figure 8B:
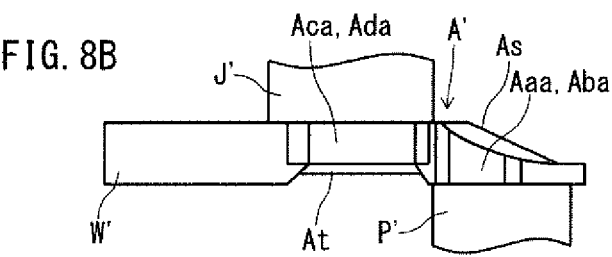
FIG. 8B is a view from a direction indicated by the dashed arrow in FIG. 8A.
Figure 8C:
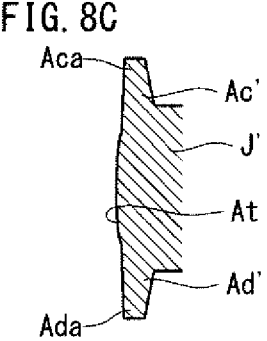
FIG. 8C is a sectional view along the line VIIIC-VIIIC in FIG. 8B.

FIGS. 8A to 8C are diagrams showing the shape of a rough arm of a forged blank with no flash before processed in the coining step, the rough arm being for the arm having the third exemplary configuration. FIG. 8A is a front view from the rough pin side, FIG. 8B is a side view, and FIG. 8C is a sectional view along the line VIIIC-VIIIC in FIG. 8A. In FIGS. 8A to 8C, a rough arm (with a rough weight) of the forged blank with no flash is representatively shown, and the other rough arms are not shown. FIG. 8B is a view from the direction indicated by the dashed arrow in FIG. 8A.

In the third exemplary configuration, the rough arm A' before processed in the coining step, as in the first exemplary configuration, has the same surface shape as the finished product after processed in the coining step, in the rough-journal J'-facing surface, in a region near a rough pin P' adjacent thereto, in an area As inside of both side portions Aa' and Ab'. Further, as in the first exemplary configuration, the rough arm A' has first excess portions Aaa and Aba protruding from the outer peripheries of the side portions Aa' and Ab' in the region near the adjacent rough pin P.

In the forged blank with no flash before processed in the coining step, the arm A', which has a rough weight W' integrated therewith, has the same surface shape as the finished product after processed in the coining step, in the rough-pin P'-facing surface, in a region near a rough journal J' adjacent thereto, in an area At inside of both side portions Ac' and Ad'. The surface shape extends smoothly to the side portions Ac' and Ad' in the region near the adjacent rough journal J'. Also, the rough arm A' with the rough weight W' integrated therewith has second excess portions Aca and Ada disposed in the side portions Ac' and Ad', respectively, in the region near the adjacent rough journal J'. The second excess portions Aca and Ada protrude from the outer peripheries of the side portions Ac' and Ad' in the region near the adjacent rough journal J'.

In the forged blank with no flash, every one of the rough arms A' with rough weights may have the first excess portions Aaa and Aba and the second excess portions Aca and Ada, or at least one of the rough arms A' with rough weights may have the first excess portions Aaa and Aba and the second excess portions Aca and Ada. In the third exemplary configuration, the rough arm A' with a rough weight has two first excess portions Aaa and Aba and two second excess portions Aca and Ada. However, the rough arm A' with a rough weight may have only one first excess portion and only one second excess portion.

All of the rough arms of the forged blank may have the third exemplary configuration. At least one of the rough arms may have the third exemplary configuration. There is no limit to the shapes of the other rough arms than the rough arms for the arms having the third exemplary configuration. The shape of the forged blank with no flash is determined according to the shape of the crankshaft.

Some examples of rough arms of a forged blank with no flash to be processed by the manufacturing apparatus according to the present embodiment have been described in connection with the first to the third exemplary configurations. The rough arms of the forged blank to be processed by the manufacturing apparatus according to the present embodiment do not need to have the first to the third exemplary configurations. In short, the forged blank with no flash has a shape that causes the forged blank with no flash to be put into an unstable posture when the forged blank with no flash is placed on the lower die. In other words, the forged blank with no flash to be processed by the manufacturing apparatus according to the present embodiment includes at least one rough arm having at least one first excess portion or at least one second excess portion.

2. Forged Crankshaft Manufacturing Apparatus

Figure 9:
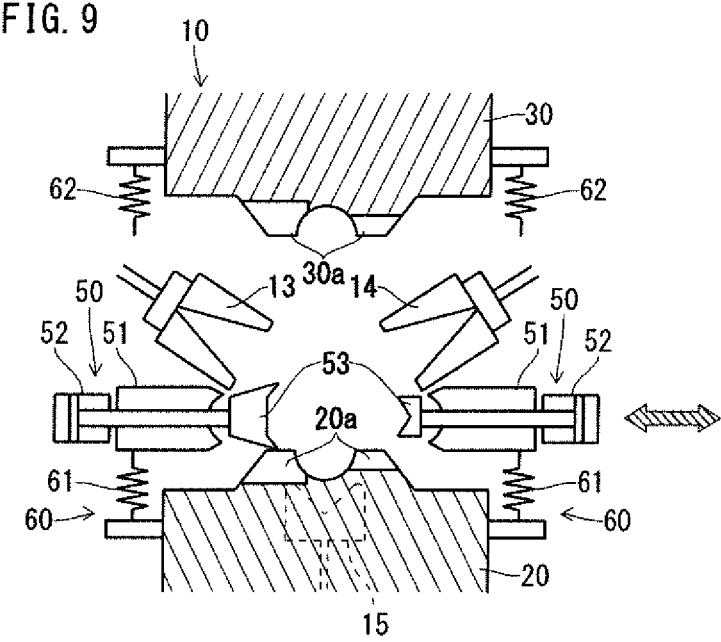
FIG. 9 is a sectional view schematically showing an exemplary configuration of a forged crankshaft manufacturing apparatus.

FIG. 9 is a sectional view of a forged crankshaft manufacturing apparatus having an exemplary configuration according to the present invention. The manufacturing apparatus 10 shown in FIG. 9 includes a first die 20, a second die 30, a retaining device 50, a moving device 60 and a knock-out member 15. The following description is of a case where the manufacturing apparatus is used in a coining step.

The first die 20, which is a lower die, and the second die 30, which is an upper die, shown in FIG. 9 are paired with each other, and apply coining to a forged blank with no flash. The first die 20 and the second die 30 also apply bending or crashing to the protruding excess portions. To this end, the first die 20 and the second die 30 have impressions. The impressions reflect the shape of the crankshaft except some parts of the crankshaft.

Specifically, when a recess is to be formed in the journal-facing surface of an arm (see FIGS. 3A to 3D), the impressions do not reflect the recess to be formed in the journal-facing surface of the arm. When a recess is to be formed in the pin-facing surface of an arm (see FIGS. 5A, 5B and FIGS. 7A to 7D), the impressions do not reflect the recess to be formed in the pin-facing surface of the arm. If the impressions reflect the shapes of these recesses, some parts of the impressions will have a reverse draft.

In order to receive third dies 53, the first die 20 and the second die 30 have open spaces 20a and 30a, respectively. The open spaces 20a and 30a are wide open along the pin decentering direction. The first lower die 20 is wide open downward to receive the knock-out member 15.

The retaining device 50 retains at least one of the rough journals or at least one of the rough pins of the forged blank with no flash. When the forged blank with no flash is retained by the retaining device 50, the rough pin decentering direction in which the rough pins are decentered from the rough journals is perpendicular to the reducing direction (up-down direction in FIG. 9) in which the first die 20 and the second die 30 apply force for reduction.

The retaining device 50 shown in FIG. 9 includes third dies 53 and holders 51. The third dies 53 form a pair of dies. The third dies 53 nip a rough journal or a rough pin to be retained from both sides. The holders 51 hold the third dies 53 such that the third dies 53 are movable away from and toward each other in the direction perpendicular to the reducing direction, that is, movable in the direction indicated by the hatched arrow in FIG. 9. The movements of the third dies 53 can be achieved, for example, by use of hydraulic cylinders 52.

The moving device 60 supports the retaining device 50 such that the retaining device 50 is movable in the reducing direction. The moving device 60 shown in FIG. 9 includes first elastic members 61 and second elastic members 62. The first elastic members 61 connect the first die 20 and the holders 51. Specifically, each of the first elastic members 61 has a first end connected to the first die 20 and a second end connected to one of the holders 51. The first elastic members 61 are stretchable in the reducing direction. As the first elastic members 61, for example, coil springs, air cylinders and the like can be used. In the present embodiment, the first elastic members 61 are directly connected to the first die 20. However, the first elastic members 61 may be connected to any other component, such as a bed (not shown) for the manufacturing apparatus, supporting the first die 20.

Each of the second elastic members 62 has a first end connected to the second die 30 and a second end that can be connected to one of the holders 51 by contact therewith. The second elastic members 62 are configured to connect and disconnect the second die 30 to and from the holders 51. Specifically, the second ends of the second elastic members 62 come into contact with the holders 51 and thereby connect with the holders 51, and the second ends of the second elastic members 62 move away from the holders 51 and thereby separate from the holders 51. The second elastic members 62 are stretchable in the reducing direction. As the second elastic members 62, for example, coil springs, air cylinders and the like can be used. In the present embodiment, the second elastic members 62 are directly connected to the second die 30. However, the second elastic members 62 may be connected to any other component, such as a ram (not shown) for the manufacturing apparatus, supporting the second die 30. In sum, it is only necessary that the retaining device 50 should be supported to be movable together with the second die 30.

In a state where the second elastic members 62 connect the second die 30 and the holders 51, the moving device 60 operates such that the amount of expansion or contraction of the first elastic members 61 accompanying a movement of the second die 30 in the reducing direction becomes equal to the amount of expansion or contraction of the second elastic members 62. Thereby, the retaining device 50 is moved such that the forged blank with no flash is positioned in the center between the first die 20 and the second die 30. On the other hand, in a state where the second elastic members 62 keep the second die 30 away from the holders 51, even when the second die 30 is moved in the reducing direction, the distance between the first die 20 and the forged blank with no flash retained by the retaining device 50 is kept constant.

The knock-out member 15 shown in FIG. 9 is located inside the first die (lower die) 20, and can be moved in the reducing direction by a lifting device (not shown). The knock-out member 15 has a recessed portion for receiving the forged blank with no flash. Two or more such knock-out members 15 are provided to support some of the rough journals and some of the rough pins, though not all of the knock-out members 15 are shown in the drawings. In this way, the forged blank with no flash is placed in the manufacturing apparatus 10.

Next, an exemplary process flow of the coining step by use of the forged crankshaft manufacturing apparatus according to the present embodiment is described with reference to the drawings.

Figure 10A:
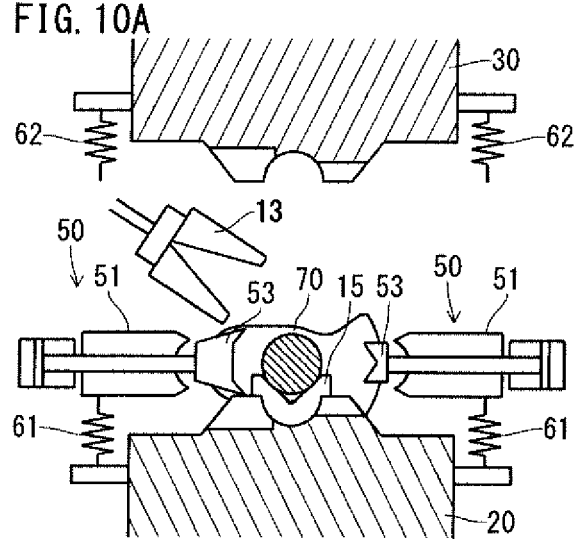
FIG. 10A is a sectional view showing, in a coining step by use of the forged crankshaft manufacturing apparatus, a time when a forged blank has been set in the manufacturing apparatus.
Figure 10B:
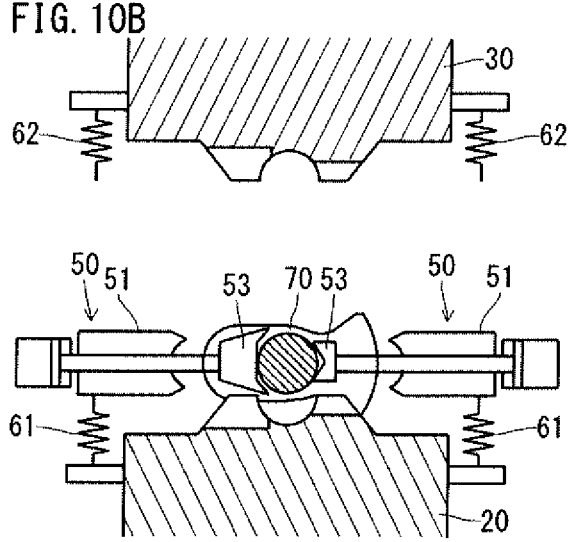
FIG. 10B is a sectional view showing, in the coining step by use of the forged crankshaft manufacturing apparatus, a state where a knock-out member is in a retracting position.
Figure 10C:
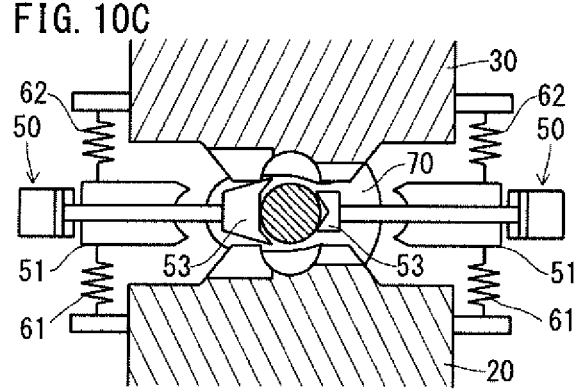
FIG. 10C is a sectional view showing, in the coining step by use of the forged crankshaft manufacturing apparatus, a state where second elastic members are connected to holders.
Figure 10D:
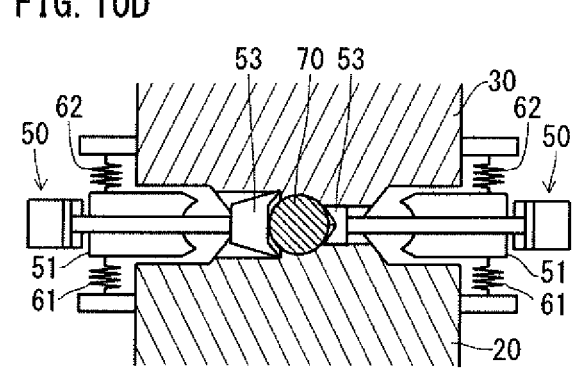
FIG. 10D is a sectional view showing, in the coining step by use of the forged crankshaft manufacturing apparatus, a time when the second die has reached the bottom dead point.
Figure 10E:
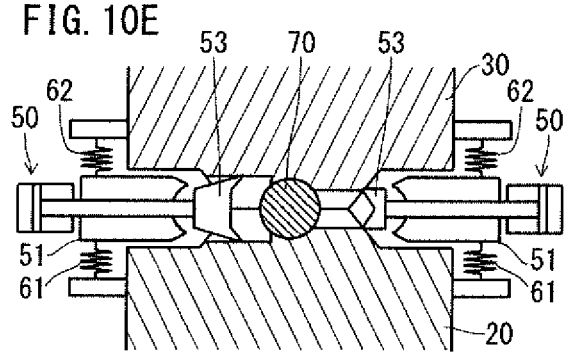
FIG. 10E is a sectional view showing, in the coining step by use of the forged crankshaft manufacturing apparatus, a state where third dies are separated from each other.
Figure 10F:
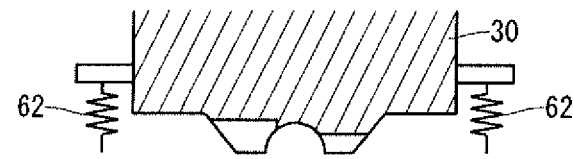
FIG. 10F is a sectional view showing, in the coining step by use of the forged crankshaft manufacturing apparatus, a time when the second die has reached the top dead point.
Figure 10F:
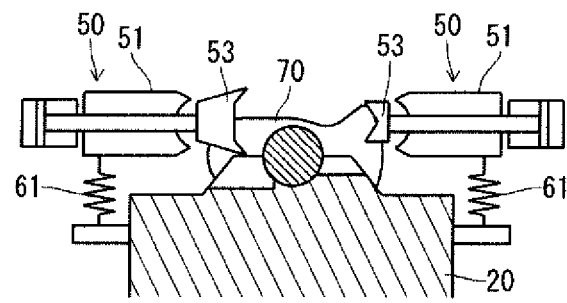
Figure 10G:
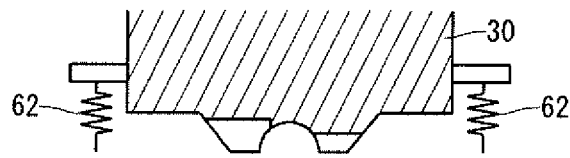
FIG. 10G is a sectional view showing, in the coining step by use of the forged crankshaft manufacturing apparatus, a state where the knock-out member is in an upper position.
Figure 10G:
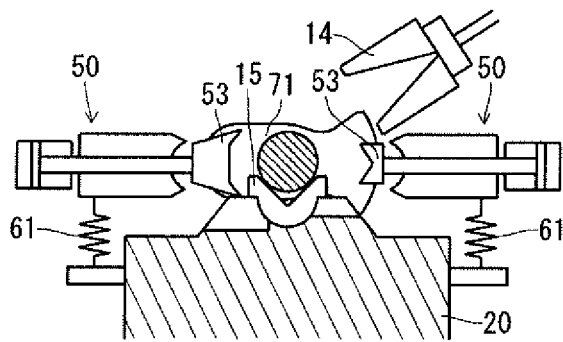

FIGS. 10A to 10G are sectional views showing the exemplary process flow of the coining step by use of the forged crankshaft manufacturing apparatus according to the present embodiment. FIG. 10A shows the time when a forged blank with no flash has been set in the manufacturing apparatus. FIG. 10B shows a state where the knock-out members are in retracting positions. FIG. 10C shows a state where the second elastic members are connected to the holders. FIG. 10D shows a time when the second die has reached the bottom dead point. FIG. 10E shows a state where the third dies are separate from each other. FIG. 10F shows a time when the second die has reached the top dead point. FIG. 10G shows a state where the knock-out members are in upper positions. FIGS. 10A to 10G show the exemplary process flow using the forged crankshaft manufacturing apparatus shown in FIG. 9. To make the drawings easy to understand, the excess portions of the forged blank with no flash 70 are not shown.

In the exemplary process flow shown in FIGS. 10A to 10O, when the coining step is to be executed, the second die (upper die) 30 is moved to the top dead point. Also, the knock-out members 15 are moved up, and the third dies 53 are separated from each other and retracted. In this state, a forged blank with no flash 70, which is a workpiece, is set on the knock-out members 15 by a carry-in robot arm 13 (see FIG. 10A).

Next, the third dies 53 are moved toward each other, and the rough journals and/or the rough pins of the forged blank with no flash 70 are nipped by the third pair of dies 53 from both sides. Then, while the forged blank with no flash 70 is held by the third pair of dies 53, the knock-out members 15 are retracted downward (see FIG. 10B).

After the knock-out members 15 are retracted downward, reduction of the forged blank with no flash 70 by use of the first die 20 and the second die 30 is started. In the exemplary process flow shown in FIGS. 10A to 10G, the second die (upper die) 30 is moved down. Before the downward movement of the second die 30, the second die 30 is sufficiently distant from the first die 20 and is separate from the holders 51. Therefore, none of the holders 51, the third dies 53 and the forged blank with no flash 70 moves, and the distances from these components to the first die 20 are kept constant. When the distance between the first die 20 and the holders 51 becomes equal to the distance between the second die 30 and the holders 51 as the second die 30 is moving down, the lower ends of the second elastic members 62 come into contact with the holders 51. Then, the second die 30 is connected to the holders 51 by the second elastic members 62 (see FIG. 10C).

When the second die 30 is moved further down while the second die 30 is connected to the holders 51 by the second elastic members 62, the first elastic members 61 and the second elastic members 62 are contracted. The amount of contraction of the first elastic members 61 and the amount of contraction of the second elastic members 62 along with the downward movement of the second die 30 are controlled to be equal to each other. Thereby, the distance between the first die 20 and the holders 51 is kept equal to the distance between the second die 30 and the holders 51. Thus, the holders 51, the third dies 53 and the forged blank with no flash 70 are positioned in the center between the first die 20 and the second die 30 at all times.

Meanwhile, along with the downward movement of the second die 30, the forged blank with no flash 70 come into contact with both the first die 20 and the second die 30 and thereby is reduced. Then, the forged blank with no flash 70 undergoes coining. The forged blank with no flash 70 includes excess portions (not shown), and the excess portions are bent or crashed.

The second die 30 reaches the bottom dead point as shown in FIG. 10D. At the time, the third dies 53 are moved away from each other (see FIG. 10E). Thereby, the retaining device 50 stops retaining the forged blank with no flash 70. Meanwhile, the forged blank with no flash 70 is kept reduced by the first die 20 and the second die 30. In the present embodiment, when the second die 30 reaches the bottom dead point, the third dies 53 are moved away from each other. However, the third dies 53 may be moved away from each other after the second die 30 starts moving upward after having reached the bottom dead point.

Next, as shown in FIG. 10F, the second die 30 is moved to the top dead point. At the time, the forged blank with no flash 70 stays on the first die 20 without moving up. While the second die 30 is connected to the holders 51 by the second elastic members 62, the holders 51 are moved up to be positioned in the center between the first die 20 and the second die 30. Thereafter, the second die 30 is disconnected from the holders 51. Then, the holders 51 no longer move up, and stay in the same position.

When the second die 30 reaches the top dead point, the knock-out members 51 are moved up. Thereby, the processed forged blank 71 is released from the first die 20. Then, the rough pins and/or the rough journals of the processed forged blank 71 are supported on the recessed portions of the knock-out members 15. The processed forged blank 71 moves up together with the knock-out members 15. Next, a take-out robot arm 14 takes out the processed forged blank 17 (see FIG. 10G).

As described above, the forged crankshaft manufacturing apparatus according to the present embodiment includes a retaining device 50. Therefore, the forged crankshaft manufacturing apparatus can keep a forged blank with no flash 70 in a specified posture even when the forged blank 70 has excess portions. The forged crankshaft manufacturing apparatus further includes a moving device 60, and the forged blank with no flash 70 can be reduced by the first die 20 and the second die 30 while being kept in the specified posture. Thus, the forged crankshaft manufacturing apparatus can certainly bend or crash the excess portions of the forged blank while applying coining to the forged blank. Therefore, trouble such as twisting of the forged blank can be prevented.

In the exemplary configuration shown in FIG. 9, the manufacturing apparatus 10 includes second elastic members 62. However, the forged crankshaft manufacturing apparatus according to the present embodiment need not include the second elastic members 62. In this case, the forged blank with no flash 70 is pressed down by the second die 30, and thereafter, comes into contact with the first die 20, whereby the forged blank 70 is reduced. In this process, the forged blank with no flash 70 can be kept in the specified posture by the third dies 53, and therefore, the forged blank with no flash 70 can certainly undergo the coining and the crashing or bending of the excess portions.

The moving device 60, as shown in FIGS. 10A to 10G, preferably moves the retaining device 50 such that the forged blank with no flash 70 is positioned in the center between the first die 20 and the second die 30 while both the first die 20 and the second die 30 are in contact with the forged blank with no flash 70. This is because uniform reduction of the forged blank with no flash 70 by the first die 20 and the second die 30 allows an improvement of the processing accuracy.

As shown in FIG. 9, the retaining device 50 may include a pair of third dies 53, and holders 51. The moving device 60 may include first elastic members 61. The pair of third dies 53 may support all of the rough journals and the rough pins of the forged blank with no flash. As long as the forged blank with no flash is retained such that the rough pin decentering direction is perpendicular to the reducing direction, not all of the rough journals and the rough pins need to be supported. For example, the third dies 53 may support only the rough journals of the forged blank with no flash. Alternatively, the third dies 53 may support only the rough pins of the forged blank with no flash. The third dies 53 may support only some of the rough journals, or the third dies 53 may support only some of the rough pins. The third dies 53 may support some of the rough journals and some of the rough pins. In sum, there is no limit to the number of rough journals and rough pins to be supported by the third dies 53 as long as the support provided by the third dies 53 can control the posture of the forged blank with no flash.

When the forged blank with no flash 70 is moved to the center between the first die 20 and the second die 30 by the moving device 60, the moving device 60 may further include second elastic members 62. In this case, the second elastic members 62 can connect and disconnect the second die 30 to and from the holders 51. The second elastic members 62 are stretchable in the reducing direction. In the exemplary configuration shown in FIG. 9, one end of each of the second elastic members 62 is contactable with one of the holders 51. The manufacturing apparatus according to the present embodiment may have any other configuration. For example, each of the second elastic members 62 may have one end connected to one of the holders 51, and another end contactable with the second die 30.

As the moving device 60, stretchable hydraulic cylinders may be used rather than the first and the second elastic members. In this case, each of the hydraulic cylinders has one end connected to the first die or the second die, and another end connected to one of the holders 51. By adjusting the lengths of the hydraulic cylinders with a downward movement of the second die, the moving device 60 can place the forged blank with no flash 70 in the center between the first die 20 and the second die 30.

The manufacturing apparatus according to the present embodiment is used to manufacture a forged crankshaft including arms having any of the first to the third exemplary configurations.

The forged crankshaft manufacturing apparatus according to the present embodiment may include a fourth die to come into contact with the rough-journal-facing surface of a rough arm except the side portions in the region near the adjacent rough pin. The fourth die is to retain the surface shape which the fourth die contacts. The forged crankshaft manufacturing apparatus may further include a fifth die to come into contact with the rough-pin-facing surface of a rough arm with no rough weight except the side portions in the region near the adjacent rough journal. The fifth die is to retain the surface shape which the fourth die contacts. The forged crankshaft manufacturing apparatus may furthermore include a sixth die to come into contact with the rough-pin-facing surface of a rough arm with a rough weight except the side portions in the region near the adjacent rough journal. The sixth die is to retain the surface shape which the fourth die contacts.

In the above paragraphs, a case in which the manufacturing apparatus according to the present embodiment is used in the coining step has been described. However, the manufacturing apparatus according to the present embodiment can be used in any other step than the coining step. For example, when another processing step is added before the coining step, the manufacturing apparatus according to the present embodiment may be used in the processing step. In sum, the manufacturing apparatus according to the present embodiment is used to process the excess portions of a forged blank with no flash.

3. Forged Crankshaft Manufacturing Method

According to the present embodiment, a method for manufacturing a forged crankshaft includes a first step and a second step. The first step and the second step are hot working to be performed successively. By the first step, a forged blank with no flash 70 as shown in FIGS. 4A to 4D is obtained. The forged blank with no flash 70 has almost the same shape as the forged crankshaft. Specifically, the forged blank with no flash 70 includes rough journals J', rough pins P' and rough arms A'. At least one of the rough arms A' of the forged blank with no flash 70 has first excess portions Aaa and Aba protruding from the outer peripheries of side portions Aa' and Ab' in a region near a rough pin P adjacent thereto.

The first step to obtain such a forged blank with no flash can be executed, for example, by executing a preforming step, a die forging step and a trimming step in this order, as in a conventional method for manufacturing a common forged crankshaft. When adjustment of the placement angles of the rough pins is necessary, a twisting step is added after the trimming step.

In the second step, the forged blank with no flash obtained by the first step undergoes bending or crashing of the first excess portions. In this step, the above-described forged crankshaft manufacturing apparatus according to the present embodiment is used. In the bending or crashing of the first excess portions, the first excess portions Aaa and Aba of the rough crank arm are deformed, whereby the rough rank arm is shaped into an arm A with thick side portions Aa and Ab in the region near the adjacent pin P. Accordingly, a crankshaft having a reduced weight and assured stiffness as shown in FIGS. 3A to 3D can be obtained.

In the forged crankshaft manufacturing method according to the present embodiment, bending or crashing of the excess portions is performed stably by use of the above-described manufacturing apparatus according to the present embodiment. Therefore, it is possible to prevent trouble, such as twisting, in the manufactured forged crankshaft.

The manufacturing method according to the present embodiment is applicable for manufacturing a forged crankshaft including arms having the second exemplary configuration shown in FIGS. 5A and 5B. The forged crankshaft includes arms A with no weights and arms with weights.

In this case, what is obtained by the first step is a forged blank with no flash including a rough arm A' with no rough weight, and the rough arm A' with no rough weight additionally has second excess portions Aca and Ada as shown in FIGS. 6A and 6B. The second excess portions Aca and Ada are disposed on the outer peripheries of both side portions of the rough arm A' with no rough weight in a region near a rough journal J' adjacent thereto. The second excess portions Aca and Ada protrude from the outer peripheries of both side portions of the rough arm A' with no rough weight in the region near the adjacent rough journal J'.

In the second step, while the first excess portions Aaa and Aba are being processed, the second excess portions Aca and Ada are also bent or crashed. Thereby, the second excess portions Aca and Ada of the rough arm A' with no rough weight are deformed. Consequently, in the crankshaft, the arm A with no weight has thick side portions Ac and Ad in the region near the adjacent journal J. Accordingly, a crankshaft with a more reduced weight and assured stiffness as shown in FIGS. 5A and 5B can be obtained.

The manufacturing method according to the present embodiment is applicable for manufacturing a forged crankshaft including an arm having the third exemplary configuration as shown in FIGS. 7A to 7D. In the forged crankshaft, the arm, which has a weight integrated therewith, has a recess in the pin P-facing surface, in a region near a journal J adjacent thereto, in an area At inside of both side portions Ac and Ad.

In this case, what is obtained by the first step is a forged blank with no flash including a rough arm A' with a rough weight, and the rough arm A' with a rough weight has second excess portions Aca and Ada in addition to the first excess portions Aaa and Aba. The second excess portions Aca and Ada are disposed on the outer peripheries of both side portions of the rough arm A' with a rough weight in a region near a rough journal J' adjacent thereto. The second excess portions Aca and Ada protrude from the outer peripheries of both side portions of the rough arm A' with a rough weight in the region near the adjacent rough journal J'.

In the second step, while the first excess portions Aaa and Aba are being processed, the second excess portions Aca and Ada are also bent or crashed. Thereby, the second excess portions Aca and Ada of the rough arm A' with a rough weight are deformed. Consequently, in the crankshaft, the arm A with a weight has thick side portions Ac and Ad in the region near the adjacent journal J. Accordingly, a crankshaft with a more reduced weight and assured stiffness as shown in FIGS. 5A and 5B can be obtained.

In the manufacturing apparatus and the manufacturing method according to the present embodiment, the retaining device keeps a forged blank with no flash in a specified posture. This allows the excess portions of the forged blank with no flash to be processed stably. There is no limit to the positions where the excess portions of the forged blank with no flash are disposed. For example, a rough crank arm may have only first excess portions or only second excess portions.

In the second step of the above-described manufacturing method according to the present embodiment, the excess portions of a forged blank with no flash are processed. In the second step, however, any other work may be performed in addition to the work of processing the excess portions. In the second step, for example, coining may be applied to the forged blank with no flash.

INDUSTRIAL APPLICABILITY

The present invention is efficiently utilized for manufacture of a forged crankshaft to be mounted in a reciprocating engine.

LIST OF REFERENCE SYMBOLS

1: forged crankshaft
J, J1 to J5: journal
P, P1 to P4: pin
Fr: front
Fl: flange
A, A1 to A8: crank arm
W, W1 to W8: counterweight
J': rough journal
P': rough pin
A': rough crank arm
W': rough counterweight
Aa, Ab: side portion of an arm in a region near a pin
Aa', Ab': side portion of a rough arm in a region near a rough pin
Aaa, Aba: first excess portion
Ac, Ad: side portion of an arm in a region near a journal
Ac', Ad': side portion of a rough arm in a region near a rough journal
Aca, Ada: second excess portion
As: inner area of a journal-facing surface of an arm, inside of side portions
At: inner area of a pin-facing surface of an arm, inside of side portions
10: forged crankshaft manufacturing apparatus
13: carry-in robot arm
14: take-out robot arm
15: knock-out member
20: first die
20a: open space
30: second die
30a: open space
50: retaining device
51: holder
52: hydraulic cylinder
53: third die
60: moving device
61: first elastic member
62: second elastic member
70: forged blank with no flash

The invention claimed is:

1. A manufacturing apparatus for processing a forged blank with no flash in a process of manufacturing a forged crankshaft including journals serving as an axis of rotation, pins decentered from the journals, and crank arms connecting the journals and the pins, wherein:

the forged blank includes rough journals, rough pins and rough crank arms corresponding to the journals, the pins and the crank arms, respectively, of the forged crankshaft; and at least one of the rough crank arms includes an excess portion protruding from an outer periphery of a side portion thereof;

the manufacturing apparatus comprising:

a first die and a second die paired with each other, the second die being movable in a reducing direction that is perpendicular to a rough pin decentering direction in which the rough pins are decentered from the rough journals and perpendicular to an axial direction of the forged blank, and the first die and the second die configured to perform reducing to bend or crash the excess portion by movement of the second die in the reducing direction relative to the first die;

a retaining device configured to retain at least one of the rough journals or at least one of the rough pins such that the rough pin decentering direction in which the rough pins are decentered from the rough journals is perpendicular to the reducing direction in which the second die moves for reduction; and a moving device configured to support the retaining device such that the retaining device is movable along the reducing direction, the retaining device including:

a pair of third dies configured to support at least one of the rough journals or at least one of the rough pins by nipping the rough journal or the rough pin from both sides; and a holder holding the pair of third dies such that the third dies are movable toward and away from each other; and the moving device includes a first elastic member stretchable in the reducing direction, the first elastic member connecting the first die to the holder or connecting a bed supporting the first die to the holder.

2. The manufacturing apparatus according to claim 1, wherein the moving device configured to move the retaining device such that the forged blank is positioned in a center between the first die and the second die while contacting both the first die and the second die.

3. The manufacturing apparatus according to claim 1, wherein:

the moving device further includes a second elastic member stretchable in the reducing direction, the second elastic member configured to connect and disconnect the second die to and from the holder.

4. The manufacturing apparatus according to claim 1, wherein the manufacturing apparatus is configured to apply coining to the forged blank.

5. The manufacturing apparatus according to claim 2, wherein the manufacturing apparatus is configured to apply coining to the forged blank.

6. The manufacturing apparatus according to claim 3, wherein the manufacturing apparatus is configured to apply coining to the forged blank.

\* \* \* \* \*